(12) United States Patent
Fairweather (10) Patent No.: US 7,210,130 B2
(45) Date of Patent: Apr. 24, 2007

(54) SYSTEM AND METHOD FOR PARSING DATA

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 706 days.

(21) Appl. No.: 10/357,324

(22) Filed: Feb. 3, 2003

(65) Prior Publication Data

US 2004/0031024 A1 Feb. 12, 2004

(51) Int. Cl.
*G06F 9/45* (2006.01)
(52) U.S. Cl. .................... 717/136; 717/140; 717/141; 717/142; 717/143; 717/144
(58) Field of Classification Search ................ 717/136, 717/140, 141, 142, 143, 144; 714/1
See application file for complete search history.

(56) References Cited

U.S. PATENT DOCUMENTS

| | | | | |
|---|---|---|---|---|
| 4,905,138 A * | 2/1990 | Bourne | ........................ | 717/139 |
| 5,105,353 A * | 4/1992 | Charles et al. | ............... | 717/143 |
| 5,276,880 A * | 1/1994 | Platoff et al. | ................ | 717/143 |
| 5,487,147 A * | 1/1996 | Brisson | ........................... | 714/1 |
| 5,748,975 A * | 5/1998 | Van De Vanter | ............ | 717/111 |
| 5,903,756 A * | 5/1999 | Sankar | ........................ | 717/131 |
| 5,963,742 A * | 10/1999 | Williams | ..................... | 717/143 |
| 5,991,539 A * | 11/1999 | Williams | ..................... | 717/143 |
| 6,353,925 B1 * | 3/2002 | Stata et al. | .................. | 717/112 |
| 7,003,764 B2 * | 2/2006 | Allison | ........................ | 717/143 |

OTHER PUBLICATIONS

Mauny, et al., "Parsers in ML", 1992, ACM, p. 76-85.*
Pai, et al., "Global Context Recovery: A New Strategy for Syntactic Error Recovery by Table-Driven Parsers", 1980, ACM, p. 18-41.*

* cited by examiner

*Primary Examiner*—Wei Zhen
*Assistant Examiner*—Qamrun Nahar
(74) *Attorney, Agent, or Firm*—Merchant & Gould PC; Stanley J. Gradisar (57) ABSTRACT

A dynamically extensible approach to parsing textual input consisting of a predictive parser and associated predictive parser generator is provided. The combination, together with a plug-in/resolver architecture, provides the ability to handle a set of languages that is vastly larger than that conventionally handled by predictive parsing techniques. The generator accepts extended BNF language specifications containing embedded reverse polish plug-in call specifications giving the plug-in number to be called as well as an arbitrary textual parameter to be passed to the plug-in. The parser supports the ability to register a 'resolver' function as well as one or more custom reverse-polish plug-in handlers which are passed the textual parameter(s) specified in the extended BNF as well as having full control over the parsing and evaluation stacks. The 'resolver' is with a 'no action' parameter when the parser first encounters a token in the input stream and may modify the token as necessary. The resolver is also called when the parser must evaluate or assign an entry on the evaluation stack at which time it can implement additional behaviors depending on the language or environment. Finally the 'resolver' is called when the parse terminates. The 'resolver' is the primary mechanism whereby more complex languages can be handled and is also a key part of connecting to external systems or storage when the parser is used in an interpreted context. The reverse polish plug-in functions are provided with an API to allow full control over and access to the parser stacks and can rapidly be configured to implement almost any language constructs.

25 Claims, 5 Drawing Sheets

[FIGURE 1]

```
expression      ::= lor_expr rstof_ternary <endf>
rstof_ternary   ::= <null> <or> ? lor_expr : lor_expr <@0:1>
lor_expr            ::= land_expr rstof_lor_expr
rstof_lor_expr  ::= <null> <or> || land_expr <@0:2> rstof_lor_expr
land_expr       ::= bor_expr rstof_land
rstof_land      ::= <null> <or> && bor_expr <@0:3> rstof_land
bor_expr            ::= bxor_expr rstof_bor
rstof_bor       ::= <null> <or> | bxor_expr <@0:4> rstof_bor
bxor_expr       ::= band_expr rstof_bxor
rstof_bxor      ::= <null> <or> ^ band_expr <@0:5> rstof_bxor
band_expr       ::= beq_expr rstof_band
rstof_band      ::= <null> <or> & beq_expr <@0:6> rstof_band
beq_expr            ::= cmp_expr rstof_beq
rstof_beq       ::= <null> <or> == cmp_expr <@0:7> rstof_beq
                        <or> != cmp_expr <@0:8> rstof_beq
cmp_expr            ::= shift_expr rstof_cmp
rstof_cmp       ::= <null> <or> < shift_expr <@0:9> <or> <=
                        shift_expr <@0:11> <or> > shift_expr <@0:10>
                        <or> >= shift_expr <@0:12>
shift_expr      ::= add_expr rstof_shift
rstof_shift         ::= <null> <or> << add_expr <@0:13> rstof_shift
                        <or> >> add_expr <@0:14> rstof_shift
add_expr        ::= mult_expr rstof_add
rstof_add       ::= <null> <or> + mult_expr <@0:15> rstof_add
                        <or> - mult_expr <@0:16> rstof_add
mult_expr       ::= factor rstof_multexpr
rstof_multexpr  ::= <null> <or> * factor <@0:17> rstof_multexpr
                        <or> / factor <@0:18> rstof_multexpr <or>
                        % factor <@0:19> rstof_multexpr
factor          ::= primary <or> ! primary <@0:21> <or> ~ primary
                        <@0:22> <or> - primary <@0:20> <or>
                        ++ object <@1:8> <or> -- object <@1:9> <or>
                        sizeof object <@1:10> <or> * object <@1:11>
                        <or> & object <@1:5>
primary         ::= object rstof_primary <or> Integer <or> Real
                        <or> <2:Char> <or> ( lor_expr rstof_ternary )
rstof_primary   ::= <null> <or> ++ <@1:6> <or> -- <@1:7>
object          ::= <1:Identifier> rstof_object
rstof_object    ::= <null> <or> -> <1:Identifier> <@1:2> <or> .
                        <1:Identifier> <@1:3> <or> [ lor_expr
                        rstof_ternary ] <@1:4> <or> <opnd> ( parameter_list ) <@1:1>
parameter_list  ::= <null> <or> lor_expr rstof_ternary rstof_param_list
rstof_param_list ::= <null> <or> , lor_expr rstof_ternary rstof_param_list
Integer         ::= <3:DecInt> <or> <7:HexInt> <or> <8:HexIntSizd> <or> <9:DecIntSizd>
                        <or> <10:OctInt> <or> <11:OctIntSizd>
Real            ::= <4:Float> <or> <5:FloatExp> <or> <6:FloatSizd>
```

```
Boolean myPlugin          (              // Parser plugin
        ET_ParseHdl       aParseDB,      // IO:handle to parser DB
        int32             aFunctSelector,// I:Function selector
        int32             aContextID,    // I:context value
        charPtr           pluginHint     // I:Text following plugin, or NULL
                          )              // R:TRUE for success, FALSE otherwise
{
    #define REAL(elem)   (PS_StackType(aParseDB,elem) == kIsAReal)
    #define VAL(elem)    PS_GetValue(aParseDB,elem)

switch ( aFunctSelector )            // now do switch on why we were called
    {
    ... many more cases
        case   15:                       // eval. stack elements in case still symbolic  ⎤
            PS_EvalIdent(aParseDB,NXT_STACK);                                            ⎬ 305
            PS_EvalIdent(aParseDB,TOF_STACK);                                            ⎦
            types = (REAL(TOF_STACK) << 1) | REAL(NXT_STACK);
            switch ( types )                                                             ⎤ 310
            {
                case   0:                                                                ⎤
                    PS_SetiValue(aParseDB,NXT_STACK,VAL(NXT_STACK).lValue +
                        VAL(TOF_STACK).lValue); break;
                case   1:
                    PS_SetfValue(aParseDB,NXT_STACK,VAL(NXT_STACK).dValue +
                        VAL(TOF_STACK).lValue); break;                                   ⎬ 315
                case   2:
                    PS_SetfValue(aParseDB,NXT_STACK,VAL(NXT_STACK).lValue +
                        VAL(TOF_STACK).dValue); break;
                case   3:
                    PS_SetfValue(aParseDB,NXT_STACK,VAL(NXT_STACK).dValue +
                        VAL(TOF_STACK).dValue); break;                                   ⎦
            }
            break;
    ... many more cases
    }
    PS_Pop(aParseDB);
    return (true);
}
```

[FIGURE 4]

```
Boolean myResolver      (                       // resolver plugin
    ET_ParseHdl             aParseDB,           // IO:handle to parser DB
    int32                   aContextID,         // I:Context ID parameter (parser specific)
    int32                   elem,               // I:Parser stack element (0 if no action)
    int32                   anAction,           // I:Action (0 none, 1 assign, 2 evaluate)
    int32                   tokenNumber,        // I:Lex Token number recognized
    int32                   aType,              // I:target type (anAction=1), others...
    ET_StackValuePtr        aValue,             // I:value on (anAction=1), NULL otherwise
    ...                                         // I:Additional parameters
                            )                   // R:TRUE for success, FALSE otherwise
{
    res = YES;
    switch ( anAction )
    {                                           // parser calls here as recognizes ALL tokens
    case    kResolverNoAction:
                PS_GetTokenState(aParseDB,&curTokPtr,&curTokSize,&curTokNum,
                    &curLinePtr,NULL);
                if ( aType == 0 )               // parser first encounters a token...
                {                               // default is call built in lex
                    PS_CallBuiltInLex(aParseDB);
                } else                          // aType == -1, call on accepting a token
                {
                }
                break;                          // in most situations, no action required
        case    kResolverAssign:
                token = PS_GetToken(aParseDB,elem);
                switch ( tokenNumber )          // this is assignement so...
                {
                    case    1:                  // Identifier
                        if ( token[0] >= 'A' && token[0] <= 'Z' )
                        {                       // 'A'..'Z' (int) or 'a'..'z' ( reals )
                            if ( aType == kIsAReal )
                                intValues[token[0] - 'A'] = aValue->dValue;
                            else
                                intValues[token[0] - 'A'] = aValue->lValue;
                        } else if ( token[0] >= 'a' && token[0] <= 'z' )
                        {                       // check source type,conversion required?
                            if ( aType == kIsAReal )
                                floatValues[token[0] - 'a'] = aValue->dValue;
                            else
                                floatValues[token[0] - 'a'] = aValue->lValue;
                        }
                        break;
                    default:
                        -- report error
                        res = NO;
                        break;
                }
                break;
        case    kResolverEvaluate:
                token = PS_GetToken(aParseDB,elem);
                switch ( tokenNumber )          // this is evaluation so...
                {
                    case    1:                  // Identifier
                        if ( token[0] >= 'A' && token[0] <= 'Z' )
                        {
                            res = PS_SetiValue(aParseDB,elem,intValues[token[0] - 'A']);
                        } else if ( token[0] >= 'a' && token[0] <= 'z' )
                        {
                            res = PS_SetfValue(aParseDB,elem,floatValues[token[0] - 'a']);
                        }
                        break;
                    case    2:
                        sprintf(tmp,token);     // Char -- sprintf does escape chars
                        res = PS_SetiValue(aParseDB,elem,tmp[1]);
                        break;
                    case    3:                  // Integer
```

[FIGURE 4, Continued]

```
                                case    7:
                                case    8:
                                case    9:
                                case    10:                             // we accept C
integers so this is easy!
                                case    11:
                                        intVal = strtol(token,&dummy,0);
                                        res = PS_SetiValue(aParseDB,elem,intVal);
                                        break;
                                case    4:                              // Real
                                case    5:                              // we
accept C reals so this is easy!
                                case    6:
                                        floatVal = strtod(token,&dummy);
                                        res = PS_SetfValue(aParseDB,elem,floatVal);
                                        break;
                                default:
                                        -- report error
                                        res = NO;
                                        break;
                        }
                        break;
                case    kResolverSayByeBye:             // parser calls this on completion
                        break;
                default:
                        -- report error
                        res = NO;
                        break;
        }
        return res;
}
```

SYSTEM AND METHOD FOR PARSING DATA

CROSS-REFERENCE TO RELATED APPLICATIONS

This application is related to co-pending application Ser. No. 10/357,326 filed on Feb. 3, 2003 titled "SYSTEM AND METHOD FOR ANALYZING DATA" by the same inventor of this invention, which is incorporated herein by reference in its entirety for all that is taught and disclosed therein.

BACKGROUND OF THE INVENTION

1. Field of the Invention

This invention relates to the field of compilers, and more particularly, to a parser for use in a compiler that utilizes a dynamically extensible approach to parsing textual input.

2. Description of Related Art

The analysis and parsing of textual information is a well-developed field of study, falling primarily within what is commonly referred to as 'compiler theory'. At its most basic, a compiler requires three components, a lexical analyzer which breaks the text stream up into known tokens, a parser which interprets streams of tokens according to a language definition specified via a meta-language such as Backus-Naur Form (BNF), and a code generator/interpreter. The creation of compilers is conventionally a lengthy and off-line process, although certain industry standard tools exist to facilitate this process such as LEX and YACC from the Unix world. There are a large number of textbooks available on the theory of predictive parsers and any person skilled in this art would have basic familiarity with this body of theory.

Parsers come in two basic forms, "top-down" and "bottom-up". Top-down parsers build the parse tree from the top (root) to the bottom (leaves), bottom-up parsers build the tree from the leaves to the root. For our purposes, we will consider only the top-down parsing strategy known as a predictive parser since this most easily lends itself to a table driven (rather than code driven) approach and is thus the natural choice for any attempt to create a configurable and adaptive parser. In general, predictive parsers can handle a set of possible grammars referred to as LL(1) which is a subset of those potentially handled by LR parsers (LL(1) stands for 'Left-to-right, using Leftmost derivations, using at most 1 token look-ahead'). Another reason that a top-down algorithm is preferred is the ease of specifying these parsers directly in BNF form, which makes them easy to understand by most programmers. Compiler generators such as LEX and YACC generally use a far more complex specification methods including generation of C code which must then be compiled, and thus is not adaptive or dynamic. For this reason, bottom-up table driven techniques such as LR parsing (as used by YACC) are not considered suitable.

What is needed is a process that can rapidly (i.e., within seconds) generate a complete compiler from scratch and then apply that compiler in an adaptive manner to new input, the ultimate goal being the creation of an adaptive compiler, i.e., one that can alter itself in response to new input patterns in order to 'learn' to parse new patterns appearing in the input and to perform useful work as a result without the need to add any new compiled code. This adaptive behavior is further described in Appendix 1 with respect to a lexical analyzer (referred to in the claims as the "claimed lexical analyzer"). The present invention provides a method for achieving the same rapid, flexible, and extensible generation in the corresponding parser.

SUMMARY OF INVENTION

The present invention discloses a parser that is totally customizable via the BNF language specifications as well as registered functions as described below. There are two principal routines: (a) $PS_{13}$ MakeDB( ), which is a predictive parser generator algorithm, and (b) $PS_{13}$ Parse( ), which is a generic predictive parser that operates on the tables produced by $PS_{13}$ MakeDB( ). The parser generator $PS_{13}$ MakeDB( ) operates on a description of language grammar, and constructs predictive parser tables that are passed to $PS_{13}$ Parse( ) in order to parse the grammar correctly. There are many algorithms that may be used by $PS_{13}$MakeDB( ) to generate the predictive parser tables, as described in many books on compiler theory. It consists essentially of computing the FIRST and FOLLOW sets of all grammar symbols (defined below) and then using these to create a predictive parser table. In order to perform useful action in response to inputs, this invention extends the BNF language to allow the specification of reverse-polish plug-in operation specifiers by enclosing such extended symbols between '<' and '>' delimiters. A registration API is provided that allows arbitrary plug-in functions to be registered with the parser and subsequently invoked as appropriate in response to a reverse-polish operator appearing on the top of the parser stack. The basic components of a complete parser/interpreter in this methodology are as follows:

The routine PS_Parse( ) itself (described below)

The language BNF and LEX specifications.

A plug-in 'resolver 400' function, called by PS_Parse( ) to resolve new input (described below)

One or more numbered plug-in functions used to interpret the embedded reverse-polish operators.

The 'langLex' parameter to PS_Parse( ) allows you to pass in the lexical analyzer database (created using LX_MakeDB( )) to be used to recognize the target language. There are a number of restrictions on the token numbers that can be returned by this lexical analyzer when used in conjunction with the parser. These are as follows:

1) The parser generator has it's own internal lexical analyzer which reserves token numbers 59 . . . 63 for recognizing certain BNF symbols (described below) therefore these token numbers cannot be used by the target language recognizer. Token numbers from 1 . . . 63 are reserved by the lexical analyzer to represent 'accepting' states in the 'catRange' token recognizer table, these token numbers are therefore not normally used by a lexical analyzer 'oneCat' token recognizer. What this means then is that instead of having capacity for 63 variable content tokens (e.g., names, numbers, symbols etc) in your target language, you are restricted to a maximum of 58 when using the parser.

2) If there are multiple names for a give symbol, then the multiplicity should be restricted to the lexical analyzer description, only one of the alternatives should be used in the parser tables.

3) In order to construct predictive parser tables, it is necessary to build up a 2 dimensional array where one axis is the target language token number and the other axis is the non-terminal symbols of the BNF grammar. The parser-generator is limited to grammars having no more than 256 non-terminal grammar symbols, however in order to avoid requiring MASSIVE amounts of memory and time to compute the parsing table, the number of terminal symbols (i.e., those recognized by the lexical analyzer passed in 'langLex') should be limited to 256 also. This means that the lexical analyzer should never return any token number that is greater than 'kMaxTerminalSym'. For example, token numbers 1 . . . 59 are available for use as accepting states for the 'catRange' recognizer while tokens 64 . . . 255 are available for use with the 'oneCat' recognizer.

The invention also provides a solution for applications in which a language has token numbers that use the full 32-bits provided by LEX. Immediately after calling the 'langLex' lexical analyzer to fetch the next token in the input stream, PS_Parse( ) calls the registered 'resolver 400' function with a 'no action' parameter, (normally no action is exactly what is required) but this also provides an opportunity to the plug-in code to alter the token number (and token size etc.) to a value that is within the permitted range.

There are also many other aspects of the invention that allow the parser to accept or process languages that are considerably more complex than LL(1). For example, suppose a recognizer is programmed to recognize the names of people (for which there are far more than 256 possibilities) so when a 'no-action' call is initiated, the function PS_SetCurrToken( ) could be used to alter the token number to 58 say. Then in your BNF grammar, you specify a token number of 58 (e.g., <58:Person Name>) wherever you expect to process a name. The token string will be available to the plug-in and resolver 400 functions on subsequent calls and could easily reconstitute the original token number and the plug-in code could be programmed to call 'langLex' using PS_LangLex( ). Other applications and improvements are also disclosed and claimed in this application as described in further detail below.

BRIEF DESCRIPTION OF THE DRAWINGS

FIG. 1 provides a sample BNF specification;

DETAILED DESCRIPTION OF THE PREFERRED EMBODIMENTS

As described above, the parser of this invention utilizes the lexical analyzer described in Appendix 1, and the reader may refer to this incorporated patent application for a more detailed explanation of some of the terms used herein. For illustration purposes, many of the processes described in this application are accompanied by samples of the computer code that could be used to perform such functions. It would be clear to one skilled in the art that these code samples are for illustration purposes only and should not be interpreted as a limitation on the claimed inventions.

The present invention discloses a parser that is totally customizable via the BNF language specifications as well as registered functions as described below. There are two principal routines: (a) $PS_{13}$ MakeDB( ), which is a predictive parser generator algorithm, and (b) $PS_{13}$ Parse( ), which is a generic predictive parser that operates on the tables produced by $PS_{13}$ MakeDB( ). The parser generator $PS_{13}$ MakeDB( ) operates on a description of language grammar, and constructs predictive parser tables that are passed to $PS_{13}$ Parse( ) in order to parse the grammar correctly. $PS_{13}$ MakeDB( ) has the following function prototype:

```
ET_ParseHdl PS_MakeDB  (                        // Make a predictive parser for
PS_Parse( )
    charPtr           bnf,           // I:C string specifying grammar's BNF
    ET_LexHdl                        langLex,     // I:Target language lex (from
LX_MakeDB)
    int32                            options,     // I:Various configuration options
    int32                            parseStackSize,// I:Max. depth of parser stack, 0=default
    int32                            evalStackSize // I:Max. depth of evaluation stack, 0=default
                      )                           // R:handle to created DB,
```

The 'bnf' parameter to PS_MakeDB( ) contains a series of lines that specify the BNF for the grammar in the form:

```
non_terminal    ::= production_1 <or> production_2 <or> . . .
```

Where production_1 and production_2 consist of any sequence of Terminal (described in lexical analyzer passed in to PS_MakeDB), or Non-Terminal (langLex) symbols provided that such symbols are greater than or equal to 64. Productions may continue onto the next line if required but any time a non-blank character is encountered in the first position of the line, it is assumed to be the start of a new production list. The grammar supplied must be unambiguous and LL(1).

The parser generator uses the symbols ::=, <or >, and <null> to represent BNF productions. The symbols <opnd>, <bkup>, and the variable ('catRange') symbols <@nn:mm [:hint text]>and <nn:arbitrary text>also have special meaning and are recognized by the built in parser-generator lexical analyzer. The parser generator will interpret any sequence of upper or lower case letters (a . . . z) or numbers (0 . . . 9) or the underscore character '_', that begins with a letter or underscore, and which is not recognized by, or which is assigned a token number in the range 1–63 by, the lexical analyzer passed in 'langLex', as a non-terminal grammar symbol (e.g., program, expression, if_statement etc.), these symbols are added to the parser generators grammar symbol list (maximum of 256 symbols) and define the set of non-terminals that make up the grammar. There is no need to specify this set, it is deduced from the BNF supplied. One thing that is very important however, is that the first such symbol encountered in the BNF becomes the root non-terminal of the grammar (e.g., program). This symbol is given special meaning by the parser and thus it must appear on the left hand side of the first production specified in the BNF. The <endf>symbol is used to indicate where the expected end of the input string will occur and its specification cannot be omitted from the BNF. Normally, as in the example below <endf> occurs at the end of the root non-terminal production.

Referring now to FIG. 1, a sample BNF specification is provided. This BNF gives a relatively complete description of the C language expression syntax together with enforcement of all operator precedence specified by ANSI and is sufficient to create a program to recognize and interpret C expressions. As FIG. 1 demonstrates, the precedence order may be specified simply by choosing the order in which one production leads to another with the lowest precedence grammar constructs/operators being refined through a series of productions into the higher precedence ones. Note also that many productions lead directly to themselves (e.g., more_statements ::=<null> <or > statement more_statements); this is the mechanism used to represent the fact that a list of similar constructs is permitted at this point.

The syntax for any computer language can be described either as syntax diagrams or as a series of grammar productions similar to that above (ignoring the weird '@' BNF symbols for now). Using this syntax, the code illustrated in FIG. 1 could easily be modified to parse any programs in any number of different computer languages simply by entering the grammar productions as they appear in the language's specification. The way of specifying a grammar as illustrated in FIG. 1 is a custom variant of the Backus-Naur Form (or BNF). It is the oldest and easiest to understand means of describing a computer language. The symbols enclosed between '<' '>' pairs plus the '::=' symbol are referred to as "meta-symbols". These are symbols that are not part of the language but are part of the language specification. A production of the form (non_terminal ::=production_1 <or> production_2) means that there are two alternative constructs that 'non-terminal' can be comprised or, they are 'production_1' or 'production_2'.

The grammar for many programming languages may contain hundreds of these productions, for example, the definition of Algol 60 contains 117. An LL(1) parser must be able to tell at any given time what production out of a series of productions is the right one simply by looking at the current token in the input stream and the non-terminal that it currently has on the top of it's parsing stack. This means, effectively, that the sets of all possible first tokens for each production appearing on the right hand side of any grammar production must not overlap. The parser must be able to look at the token in the input stream and tell which production on the right hand side is the 'right one'. The set of all tokens that might start any given non-terminal symbol in the grammar is known as the FIRST set of that non-terminal. When designing a language to be processed by this package, it is important to ensure that these FIRST sets are not defined consistently. In order to understand how to write productions for an LL(1) parser, it is important to understand recursion in a grammar and the difference between left and right recursion in particular.

Recursion is usually used in grammars to express a list of things separated by some separator symbol (e.g. comma). This can be expressed either as "<A>::=<A>, <B>" or "<A>::=<B>, <A>". The first form is left recursive the second form is known as right recursive. The production "more_statements ::=<null> <or > statement more_statements" above is an example of a right recursive production. Left recursive statements are not permitted because of the risk of looping during parsing. For example, if the parser tries to use a production of the form '<A>::=<A>anything' then it will fall into an infinite loop trying to expand <A>.

This is known as left recursion. Left recursion may be more subtle, as in the pair of productions '<S>::=<X>a <or> b' and '<X>::=<S> c <or> d'. Here the recursion is indirect; that is the parser expands '<S>' into '<X>a', then it subsequently expands '<X>' into '<S>c' which gets it back to trying to expand '<S>', thereby creating an infinite loop. This is known as indirect left recursion. All left recursion of this type must be eliminated from grammar before being processed by the parser. A simple method for accomplishing this proceeds as follows: replace all productions of the form '<A>::=<A> anything' (or indirect equivalents) by a set of productions of the form "<A>::=t1 more_t1 <or > . . . <or > tn more_tn" where t1 . . . tn are the language tokens (or non-terminal grammar symbols) that start the various different forms of '<A>'.

A second problem with top down parsers, in general, is that the order of the alternative productions is important in determining if the parser will accept the complete language or not. On way to avoid this problem is to require that the FIRST sets of all productions on the right hand side be non-overlapping. Thus, in conventional BNF, it is permissible to write:

expression ::= element<or>element + expression<or>element*expression

To meet the requirements of PS_MakeDB( ) and of an LL(1) parser, this BNF statement may be reformulated into a pair of statements viz:

expression ::= element rest_of_expression
rest_of_expression ::= <null> <or> * expression <or> * expression As can be seen, the 'element' token has been factored out of the two alternatives (a process known as left-factoring) in order to avoid the possibility of FIRST sets that have been defined more than once. In addition, this process has added a new symbol to the BNF meta-language, the <null> symbol. A<null> symbol is used to indicate to the parser generator that a particular grammar non-terminal is nullable, that is, it may not in fact be present at all in certain input streams. There are a large number of examples of the use of this technique in the BNF grammar illustrated in FIG. 1 such as statement 100.

The issues above discuss the manner in which LL(1) grammars may be created and used. LL(1) grammars, however, can be somewhat restrictive and the parser of the present invention is capable of accepting a much larger set by the use of deliberate ambiguity. Consider the grammar:

operand ::= expression <or> ( address_register )

This might commonly occur when specifying assembly language syntax. The problem is that this is not LL(1) since expression may itself start with a '(' token, or it may not, thus when processing operand, the parser may under certain circumstances need to look not at the first, but at the second token in the input stream to determine which alternative to take. Such a parser would be an LL(2) parser. The problem cannot be solved by factoring out the '(' token as in the expression example above because expressions do not have to start with a '('. Thus without extending the language beyond LL(1) the normal parser be unable to handle this situation. Consider however the modified grammar fragment:

```
operand         ::= .... <or> ( expr_or_indir <or> expression
expr_or_indir   ::= Aregister ) <or> expression)
```

Here we have a production for operand which is deliberately ambiguous because it has a multiply defined first set since '(' is in FIRST of both of the last two alternatives. The modified fragment arranges the order of the alternatives such that the parser will take the "(expr_or_indir" production first and should it fail to find an address register following the initial '(' token, the parser will then take the second production which correctly processes "expression )" since expression itself need not begin with a '(' token. If this case were permitted, the parser would have the equivalent of a two token look-ahead hence the language it can accept is now LL(2).

Alternatively, an options parameter 'kIgnoreAmbiguities' could be passed to PS_MakeDB( ) to cause it to accept grammars containing such FIRST set ambiguities. On problem with this approach, however, is that it can no longer verify the correctness of the grammar meaning that the user must ensure that the first production can always be reduced to the second production when such a grammatical trick is used. As such, such a parameter should only be used when the grammar is well-understood.

Grammars can get considerably nastier than LL(2). Consider the problem of parsing the complete set of 68K assembly language addressing modes, or more particularly the absolute, indirect, pre-decrement and post-increment addressing modes. The absolute and indirect syntax was presented above, however the pre-decrement addressing mode adds the form "−(Aregister)", while the post-increment adds the form "(Aregister )+". An LL(3) parser would be needed to handle the predecrement mode since the parser cannot positively identify the predecrement mode until it has consumed both the leading '−' and '(' tokens in the input stream. An LL(4) parser is necessary to recognize the postincrement form. One option is to just left-factor out the "(Aregister )" for the postincrement form. This approach would work if the only requirement was recognition of a valid assembly syntax. To the extent that the parser is being used to perform some useful function, however, this approach will not work. Instead, this can be accomplished by inserting a reverse polish plug-in operator. The polish plug-in operator calls for the form <@n:m[:hint text]> into the grammar. Whenever the parser is exposed to such an operator on the top of the parsing stack, it calls it in order to accomplish some sort of semantic action or processing. Assuming a different plug-in is called in order to handle each of the different 68K addressing modes, it is important to know what addressing mode is presented in order to ensure that the proper plug-in is called. In order to do this, the present invention extends the parser language set to be LL(n) where 'n' could be quite large.

The parser of the present invention extend the parser language in this fashion by providing explicit control of limited parser back-up capabilities. One way to provide these capabilities is by adding the <bkup> meta-symbol. Backing up a parser is complex since the parsing stack must be repaired and the lexical analyzer backed-up to an earlier point in the token stream in order to try an alternative production. Nonetheless, the PS_Parse( ) parser is capable of limited backup within a single input line by use of the <bkup> flag. Consider the modified grammar fragment:

```
operand         ::= . . . <or> ( Aregister <bkup> areg_indirect <or>
                    abs_or_displ <or> . . .
abs_or_displ    ::= − ( ARegister <bkup> ) <@1:1> <or> expression
                    <@1:2>
areg_indirect   ::= ) opt_postinc
opt_postinc     ::= <@1:3> <or> + <@1:4>
```

A limited backup is provided through the following methodology. Let us assume that <@1:1> is the handler for the predecrement mode, <@1:2> for the absolute mode, <@1:3> for the indirect mode, and <@1:4> for the postincrement mode. When the parser encounters a '(' token it will push on the "(Aregister <bkup> areg_indirect" production. Whenever the parser notices the presence of the <bkup> symbol in the production being pushed, however, it saves it's own state as well as that of the input lexical analyzer. Parsing continues and the '(' is accepted. Now lets assume instead that the input was actually an expression so when the parser tries to match the 'ARegister' terminal that is now on the top of it's parsing stack, it fails. Without the backup flag, this is considered a syntax error and the parser aborts. Because the parser has a saved state, however, the parser restores the backup of the parser and lexical analyzer state to that which existed at the time it first encountered the '(' symbol. This time around, the parser causes the production that immediately follows the one containing the <bkup> flag to be selected in preference to the original. Since the lexical analyzer has also been backed up, the first token processed is once again '(' and parsing proceeds normally through "abs_or_displ" to "expression" and finally to invocation of plug-in <@1:2> as appropriate for the absolute mode.

Note that a similar but slightly different sequence is caused by the <bkup> flag in the first production for "abs_or_displ" and that in all cases, the plug-in that is appropriate to the addressing mode encountered will be invoked and no other. Thus, by using explicit ambiguity plus controlled parser backup, the present invention provides a parser capable of recognizing languages from a set of grammars that are considerably larger than those normally associated with predictive parsing techniques. Indeed the set is sufficiently large that it can probably handle practically any computer programming language. By judicious use of the plug-in and resolver 400 architectures described below, this language set can be further extended to include grammars that are not context-free (e.g., English,) and that cannot be handled by conventional predictive parsers.

In order to build grammars for this parser, it is also important to understand is the concept of a FOLLOW set. For any non-terminal grammar symbol X, FOLLOW(X) is the set of terminal symbols that can appear immediately to the right of X in some sentential form. In other words, it is the set of things that may come immediately after that grammar symbol. To build a predictive parser table, $PS_{13}$ MakeDB( ) must compute not only the FIRST set of all non-terminals (which determines what to PUSH onto the parsing stack), but also the FOLLOW sets (which determine when to POP the parsing stack and move to a higher level production). If the FOLLOW sets are not correct, the parser will never pop its stack and eventually will fail. For this reason; unlike for FIRST sets, ambiguity in the FOLLOW sets is not permitted. What this means is that for any situation in a grammar, the parser must be able to tell when it is done with a production by looking at the next token in the input stream (i.e., the first token of the next production). PS₁₃ MakeDB( ) will reject any grammar containing ambiguous FOLLOW sets.

Figure 2:
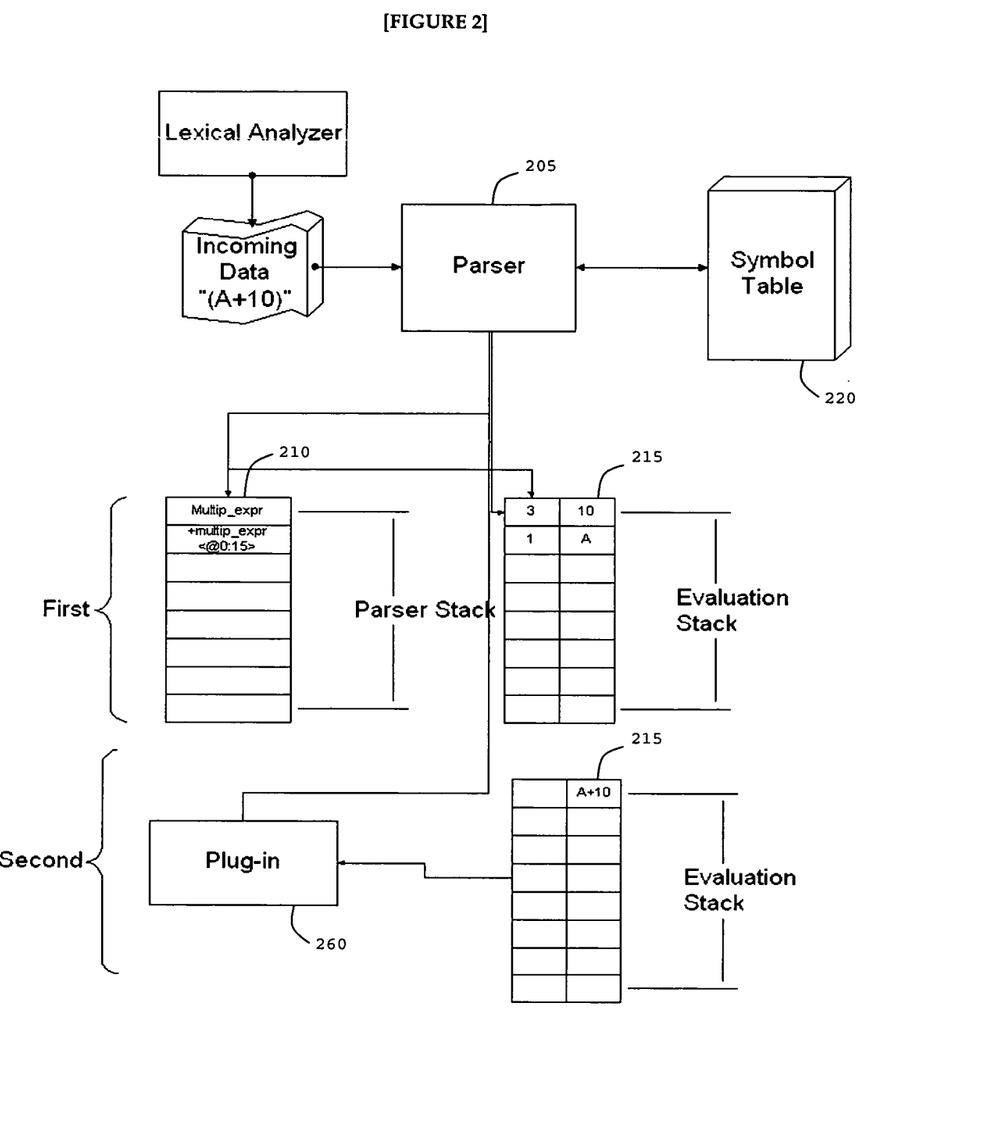
FIG. 2 is a block diagram illustrating a set of operations as performed by the parser of the present invention.

Before illustrating how the parser of the present invention can be used to accomplish specific tasks, it is important understand how PS₁₃ Parse( ) 205 actually accomplishes the parsing operation. Referring now to FIG. 2, the parsing function of the present invention is shown. PS_Parse( ) 205 maintains two stacks, the first is called the parser stack 210 and contains encoded versions of the grammar productions specified in the BNF. The second stack is called the evaluation stack 215 Every time the parser accepts/consumes a token in the input stream in the range 1 . . . 59, it pushes a record onto this evaluation stack 215. Records on this stack 215 can have values that are either integer, real, pointer or symbolic. When the record is first pushed onto the stack 215, the value is always 'symbolic' since the parser itself does not know how to interpret symbols returned by the lexical analyzer 250 that lie in this range. A symbolic table entry 220 contains the token number recognized by the 'langLex' lexical analyzer 250, together with the token string. In the language defined in FIG. 1, the token number for identifier is 1 (i.e. line 110) while that for a decimal integer is 3 (i.e., line 115), thus if the parser 205 were to encounter the token stream "A+10", it would add two symbol records to the evaluation stack 215. The first would have token number 1 and token string "A" and, the second would have token number 3 and token string "10". At the time the parser 205 processes an additive expression such as "A+10", it's parser (not evaluation) stack 210 would appear as "mult_expr +mult_expr <@0:15>" where the symbol on the left is at the top of the parser stack 210. As the parser 205 encounters the 'A' in the string "A+10", it resolves mult_expression until it eventually accepts the 'A' token, pops it off the parser stack 210, and pushes a record onto the evaluation stack 215. So now the parsing stack 210 looks like "+ mult_expr <@0:15>" and, the evaluation stack 215 contains just one element "[token=1, String='A']". The parser 205 then matches the '+' operator on the stack with the one in the input and pops the parser stack 210 to obtain "mult_expr <@0:15>". Parsing continues with the input token now pointing at the 10 until it too is accepted. This process yields a parser stack 210 of "<@0:15>" and an evaluation stack 215 of "[token=3, String='10'][token=1,String='A']" where the left hand record is considered to be the top of the stack.

At this point, the parser 205 recognizes that it has exposed a reverse-polish plug-in operator on the top of its parser stack 210 and pops it, and then calls the appropriate plug-in, which, in this case, is the built in add operation provided by PS_Evaluate( ) 260, a predefined plug-in called plug-in zero 260. When the parser 205 calls plug-in zero 260, the parser 205 passes the value 15 to the plug-in 260. In this specific case, 15 means add the top two elements of the parsing stack, pop the stack by one, and put the result into the new top of stack. This behavior is exactly analogous to that performed by any reverse polish calculator. This means that the top of the evaluation stack 215 now contains the value A+10 and the parser 205 has actually been used to interpret and execute a fragment of C code. Since there is provision for up to 63 application defined plug-in functions, this mechanism can be used to perform any arbitrary processing as the language is parsed. Since the stack 215 is processed in reverse polish manner, grammar constructs may be nested to arbitrary depth without causing confusion since the parser 205 will already have collapsed any embedded expressions passed to a higher construct. Hence, whenever a plug-in is called, the evaluation stack 215 will contain the operands to that plug-in in the expected positions.

Figure 3:
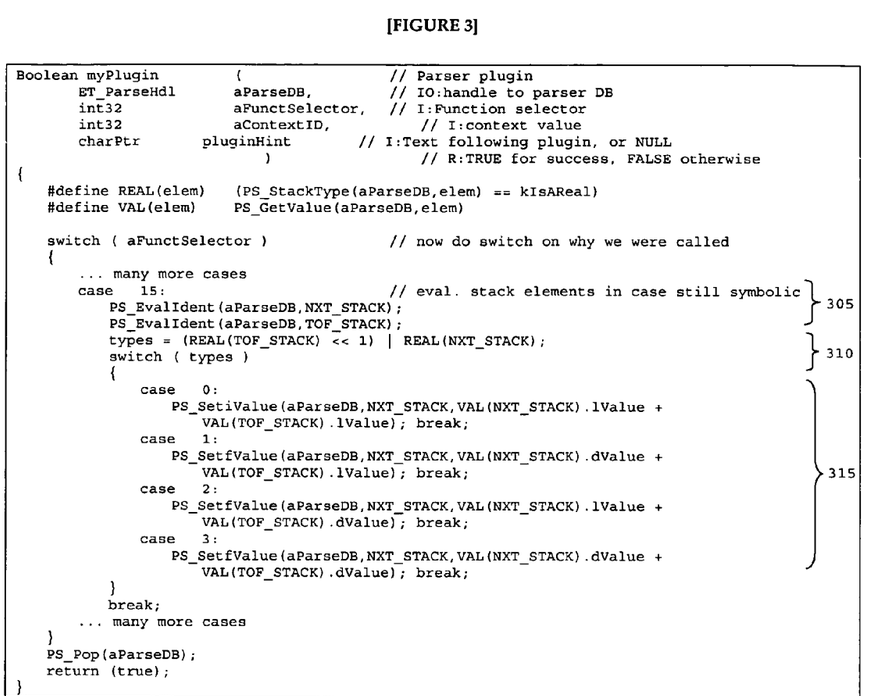
FIG. 3 provides a sample code fragment for a predefined plug-in that can work in conjunction with the parser of the present invention.

To illustrate how a plug-in might look, FIG. 3 provides a sample code fragment from a predefined plug-in that handles the '+' operator (TOF_STACK is defined as 0, NXT_STACK as 1). As FIG. 3 illustrates, this plug-in first evaluates 305 the values of the top two elements of the stack by calling PS_EvalIdent( ). This function invokes the registered 'resolver 400' function in order to convert a symbolic evaluation stack record to a numeric value (see below for description of resolver 400). Next the plug-in must determine 310 the types of the two evaluation stack elements (are they real or integer?). This information is used in a case statement to ensure that C performs the necessary type conversions on the values before they are used in a computation. After selecting the correct case block for the types of the two operands, the function calls PS_SetiValue( ) or PS_SetfValue( ) 315 as appropriate to set the numeric value of the NXT_STACK element of the evaluation stack 215 to the result of adding the two top stack elements. Finally, at the end of the routine, the evaluation stack 215 is popped 220 to move the new top of the stack to what was the NXT_STACK element. This is all it takes to write a reverse polish plug-in operator. This aspect of the invention permits a virtually unlimited number of support routines that could be developed to allow plug-ins to manipulate the evaluation stack 215 in this manner.

Another problem that has been addressed with the plug-in architecture of the present invention is the problem of having the plug-in function determine the number of parameters that were passed to it; for instance, a plug-in would need to know the number of parameters in order to process the C printf( ) function (which takes a variable number of arguments). If a grammar does not force the number of arguments (as in the example BNF above for the production "<opnd>(parameter_list )<@1:1>", then a <opnd> meta-symbol can be added at the point where the operand list begins. The parser 205 uses this symbol to determine how many operands were passed to a plug-in in response to a call requesting this information. Other than this purpose, the <opnd> meta-symbol is ignored during parsing. The <opnd> meta-symbol should always start the right hand side (RHS) of a production in order to ensure correct operand counting. For example, the production:

```
primary    ::= <9:Function> <opnd> ( parameter_list) <@1:1>
```

Will result in an erroneous operand count at run time, while the production pair below will not:

```
primary          ::= <9:Function> rstof_fn_call <@1:1>
restof_fn_call   ::= <opnd> ( parameter_list )
```

The last issue is how to actually get the value of symbols into the parser 205. This is what the symbols in the BNF of the form "<n:text string>" are for. The numeric value of 'n' must lie between 1 and 59 and it refers to the terminal symbol returned by the lexical analyzer 250 passed in via 'langLex' to PS_MakeDB( ). It is assumed that all symbols in the range 1 . . . 59 represent 'variable tokens' in the target language. That is, tokens whose exact content may vary (normally recognized by a LEX catRange table) in such a way that the string of characters within the token carry additional meaning that allows a 'value' to be assigned to that token. Examples of such variable tokens are identifiers, integers, real numbers etc. A routine known as a 'resolver 400' will be called whenever the value of one of these tokens is required or as each token is first recognized. In the BNF illustrated in FIG. 1, the lexical analyzer 250 supplied returns token numbers 3, 7, 8, 9, 10 or 11 for various types of C integer numeric input; 4, 5, and 6 for various C real number formats; 1 for a C identifier (i.e., non-reserved word); and 2 for a character constant.

Figure 4:
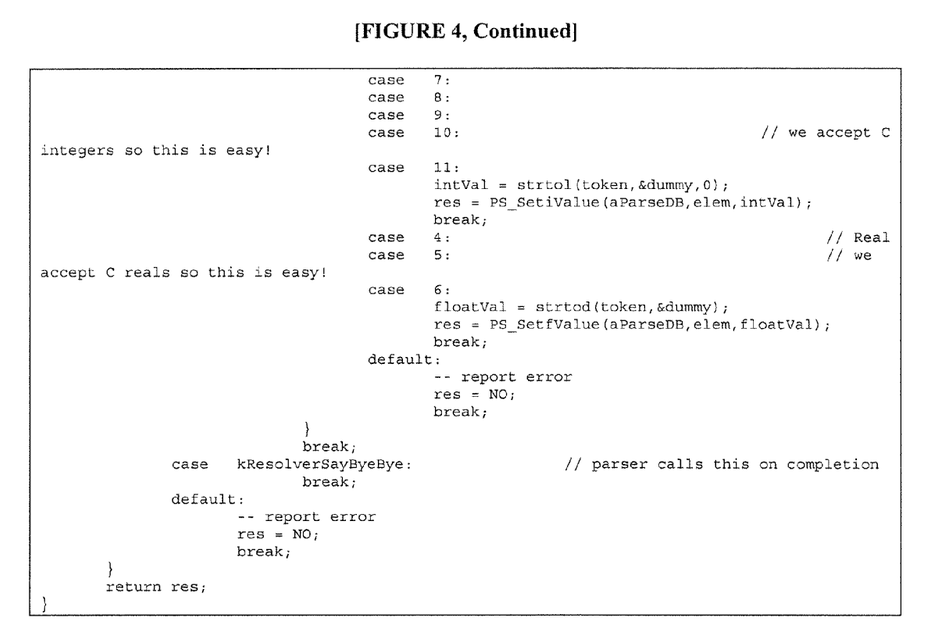
FIG. 4 provides sample code for a resolver of the present invention.

Referring now to FIG. 4, a simple resolver 400 which converts these tokens into the numeric values required by the parser 205 (assuming that identifiers are limited to single character values from A . . . Z or a . . . z) is shown. As FIG. 3 illustrates, when called to evaluate a symbol, the resolver 400 determines which type of symbol is involved by the lexical analyzer token returned. It then calls whatever routine is appropriate to convert the contents of the token string to a numeric value. In the example above, this is trivial because the lexical analyzer 250 has been arranged to recognize C language constructs. Hence we can call the C I/O library routines to make the conversion. Once the value has been obtained, the resolver 400 calls the applicable routine and the value is assigned to the designated evaluation stack 215 entry. The resolver 400 is also called whenever a plug-in wishes to assign a value to a symbolic evaluation stack 215 entry by running the 'kResolver Assign' case block code. In this case, the value is passed in via the function parameters and the resolver 400 uses the token string in the target evaluation stack 215 entry to determine how and where to store the value.

The final purpose of the resolver function 400 is to examine and possibly edit the incoming token stream in order to effectively provide unlimited grammar complexity. For example, consider the problem of a generalized query language that uses the parser. It must define a separate sub-language for each different container type that may be encountered in a query. In such a case, a resolver function 400 could be provided that recognizes the beginning of such a sub-language sequence (for example a SQL statement) and modifies the token returned to consume the entire sequence. The parser 205 itself would then not have to know the syntax of SQL but would simply pass the entire SQL statement to the selected plug-in as the token string for the symbol returned by the recognizer. By using this approach, an application using PS_Parse( ) is capable of processing virtually any grammar can be built.

The basic Application Programming Interface (API) to the parser 205 of this invention is given below. The discussion that follows describes the basic purpose of these various API calls. Sample code for many of these functions is provided in Appendix A.

PS_SetParserTag( ), PS_GetParserTag( ). These functions get and permit modification of a number of numeric tag values associated with a parser 205. These values are not used by internal parser 205 code and are available for custom purposes. This is often essential when building custom parsing applications upon this API.

PS_Pop( ), PS_Push( ). The functions pop or push the parser 205 evaluation stack 215 and are generally called by plug-ins.

PS_PushParserState( ), PS_PopParserState( ). Push/Pop the entire internal parser 205 state. This capability can be used to implement loops, procedure calls or other similar interpreted language constructs. These functions may be called within a parser plug-in in order to cause a non-local transfer of the parser state. The entire parser state, including as a minimum the evaluation stack 215, parser stack 210, and input line buffer must be saved/restored.

PS_ParseStackElem( ). This function returns the current value of the specified parser stack 210 element (usually the top of the stack). This stack should not be confused with the evaluation stack 215 to which most other stack access functions in this API refer. As described above, the parser stack 210 is used internally by the parser 205 for predictive parsing purposes. Values below 64 are used for internal purposes and to recognize complex tokens such as identifiers or numbers, values above 64 tend to be either terminal symbols in the language being parsed, or non-terminals that are part of the grammar syntax definition (>=32256). Plug-ins have no direct control of the parser stack 210, however they may accomplish certain language tricks by knowing the current top of stack and altering the input stream perceived by the parser 205 as desired.

PS_PopTopOfParseStack( ),PS_PushTopOfParseStack( ). PS_PopTopOfParseStack( ) pops and discards the top of the parser stack 210 (see PS_TopOfParseStack). This is not needed under normal circumstances, however this technique can be used to discard unwanted terminal symbols off the parser stack 210 in cases where the language allows these to be optional under certain circumstances too complex to describe by syntax.

PS_WillPopParseStack( ). In certain circumstances, it may be necessary for a parser recognizer function to determine if the current token will cause the existing parser stack 210 to be popped, that is "is the token in the FOLLOW set of the current top of the parse?" This information can be used to terminate specialized modes where the recognizer loops through a set of input tokens returning −3, which causes the parser 205 to bulk consume input. A parameter is also provided that allows the caller to determine where in the parser stack 210 the search can begin, normally this would be the top of the stack i.e., parameter=0.

PS_IsLegalToken( ). This function can be used to determine if a specific terminal token is a legal starting point for a production from the specified non-terminal symbol. Among other things, this function may be used within resolver 400 functions to determine if a specific token number will cause a parsing error if returned given the current state of the parsing stack. This ability allows resolver 400 functions to adjust the tokens they return based on what the parse state is.

PS_GetProduction( ). This function obtains the parser production that would replace the specified non-terminal on the parser stack 210, evaluation stack 215 if the specified terminal were encountered in the input. This information can be used to examine future parser 205 behavior given the current parser 205 state and input. The [0] element of each element of the production returned contains the terminal or non-terminal symbol concerned and can be examined using routines like PS_IsPostFixOperator( ).

PS_IsPostFixOperator( ) determines if the specified parse stack element corresponds to the postfix operator specified.

PS_MakeDB( ). This function creates a complete predictive parsing database for use with PS_Parse( ). If successful, returns a handle to the created DB, otherwise returns zero. The algorithm utilized by this function to construct a predictive parser 205 table can be found in any good reference on compiler theory. The parser 205 utilizes a supplied lexical analyzer as described in Appendix 1. When no longer required, the parser 205 can be disposed using PS_KilIDB ( ).

PS_DisgardToken( ). This function can be called from a resolver 400 or plug-in to cause the current token to be discarded. In the case of a resolver 400, the normal method to achieve this effect is to return −3 as the resolver 400 result, however, calling this function is an alternative. In'the case of a plug-in, a call to this function will cause an immediate call to the resolver 400 in order to acquire a new token.

PS_RegisterParser( ), PS_DeRegisterParser( ), PS_ResolveParser( ), PS_CloneDB( ). These routines are all associated with maintaining a cache of recently constructed parsers so that subsequent invocations of parsers for identical languages can be met instantaneously. The details of this cache are not pertinent to this invention.

PS_LoadBNF( ), PS_LoadBlock( ), PS_ListLanguages( ). These routines are all associated with obtaining the BNF specification for a parser 205 from a text file containing a number of such specifications. The details of this process are not pertinent to this invention.

PS_StackCopy( ). This function copies one element of a parser stack 210 to another.

$PS_{13}$ SetStack( ) sets an element of a parser stack 210 to the designated type and value.

PS_CallBuiltInLex( ). This function causes the parser to move to the next token in the input stream. In some situations, a resolver 400 function may wish to call it's own lexical analyzer prior to calling the standard one, as for example, when processing a programming language where the majority of tokens appearing in the input stream will be symbol table references. By calling it's own analyzer first and only calling this function if it fails to recognize a token, a resolver 400 can save a considerable amount of time on extremely large input files.

PS_GetLineCount( ). This function returns the current line count for the parse. It is only meaningful from within the parse itself (i.e., in a plug-in or a resolver 400 function).

PS_GetStackDepth( ). This function returns the current depth of the parsing evaluation stack. This may be useful in cases where you do not want to pay strict attention to the popping of the stack during a parse, but wish to ensure that it does not overflow by restoring it to a prior depth (by successive PS_Pop( )'s) from a plug-in at some convenient synchronizing grammatical construct.

PS_SetOptions( ), PS_ClrOptions( ), PS_GetOptions( ). The function PS_SetOptions( ) may be used to modify the options for a parse DB (possibly while it is in progress). One application of such a function is to turn on full parse tracing (from within a plug-in or resolver 400) when the line count reaches a line at which you know the parse will fail. PS_ClrOptions performs the converse operation, that is, it clears the parsing options bits specified. The function PS_GetOptions( ) returns the current options settings.

PS_FlagError( ). In addition to invoking an underlying error logging facility if something goes wrong in a plug-in or resolver 400, this routine can be called to force the parser to abort. If this routine is not called, the parse will continue (which may be appropriate if the erroneous condition has been repaired).

PS_ForceReStart( ). This function causes the parse to re-start the parse from scratch. It is normally used when plug-ins or resolver 400s have altered the source text as a result of the parsing process, and wish the parser to re-scan in order to force a new behavior. This function does not alter the current lexical analyzer position (i.e., it continues from where it left off). If you wish to do this also you must call PS_SetTokenState( ).

PS_StackType( ) This function gets the contents type of a parser stack element and return the stack element type. PS_GetOpCount( ) gets the number of operands that apply to the specified stack element which should be a plug-in reverse polish operator, it returns the number of operands passed to the plug-in or −1 if no operand list is found. PS_GetValue( ) gets the current value of a parser stack element and returns a pointer to the token string, or NULL if not available.

PS_SetElemFlags( ), PS_ClrElemFlags( ), PS_GetElemFlags( ). The first two routines set or clear flag bits in the stack element flag word. PS_GetElemFlags( ) returns the whole flags word. These flags may be used by resolver 400s and plug-ins to maintain state information associated with elements on the evaluation stack 215.

PS_SetiValue( ), PS_SetfValue( ), PS_SetpValue( ), PS_SetsValue( ). These routines set the current value and type of a parser stack element to the value supplied where:
  PS_SetiValue( )—sets the element to a 64 bit integer
  PS_SetfValue( )—sets the element to a double
  PS_SetpValue( )—sets the element to a pointer value
  PS_SetsValue( )—sets the element to a symbol number PS_GetToken( ). Gets the original token string for a parsing stack element. If the stack element no longer corresponds to an original token (e.g., it is the result of evaluating an expression) then this routine will return NULL, otherwise it will return the pointer to the token string.

PS_AssignIdent( ). This routine invokes the registered identifier resolver 400 to assign a value of the specified type to that identifier; it is normally called by plug-ins in the course of their operation.

PS_EvalIdent( ). This routine invokes the registered identifier resolver 400 to evaluate the specified identifier, and assign the resulting value to the corresponding parser stack element (replacing the original identifier record); it is normally called by plug-ins in the course of their operation. Unlike all other assignments to parser stack elements, the assignment performed by the resolver 400 when called from this routine does not destroy the original value of the token string that is still available for use in other plug-in calls. If a resolver 400 wishes to preserve some kind of token number in the record, it should do so in the tag field that is preserved under most conditions.

PS_SetResolver 400( ),PS_SetPlugIn( ). These two functions allow the registration of custom resolver 400 and plug-in functions as described above. Note that when calling a plug-in, the value of the 'pluginHint' will be whatever string followed the plug-in specifier in the BNF language syntax (e.g., <@1:2:Arbitrary string>). If this optional string parameter is not specified OR if the 'kPreserveBNFsymbols' option is not specified when creating the parser, 'pluginHint' will be NULL. This capability is very useful when a single plug-in variant is to be used for multiple purposes each distinguished by the value of 'pluginHint' from the BNF. One special and very powerful form of this that will be explored in later patents is for the 'pluginHint' text to be the source for interpretation by an embedded parser, that is executed by the plug-in itself.

PS_SetLineFinder( ). Set the line-finder function for a given parser database. Line-finder functions are only required when a language may contain embedded end-of-line characters in string or character constants, otherwise the default line-finder algorithm is sufficient.

PS_SetContextID( ),PS_GetContextID( ). The set function may be called just once for a given parser database and sets the value for the 'aContextID' parameter that will be passed to all subsequent resolver 400 and plug-in calls, and which is returned by the function PS_GetContextID( ). The context ID value may be used by the parser application for whatever purpose it requires, it effectively serves as a global common to all calls related to a particular instance of the parser. Obviously an application may chose to use this value as a pointer to additional storage.

PS_AbortParse( ). This function can be called from a resolver 400 or plug-in to abort a parse that is in progress.

PS_GetSourceContext( ). This function can be used to obtain the original source string base address as well as the offset within that string corresponding to the current token pointer. This capability may be useful in cases where parser 205 recognizers or plug-ins need to see multiple lines of source text in order to operate.

PS_GetTokenState( ), PS_SetTokenState( ). These routines are provided to allow a resolver 400 function to alter the sequence of tokens appearing at the input stream of the parser 205. This technique is very powerful in that it allows the grammar to be extended in arbitrary and non-context-free ways. Callers to these functions should make sure that they set all the three token descriptor fields to the correct value to accomplish the behavior they require. Note also that if resolver 400 functions are going to actually edit the input text (via the token pointer) they should be sure that the source string passed to PS_Parse( ) 205 is not pointing to a constant string but is actually in a handle for which source modification is permissible. The judicious use of token modification in this manner is key to the present invention's ability to extend the language set that can be handled far beyond LL(1).

PS_SetFlags( ), PS_ClrFlags( ), PS_GetFlags( ). Set or clear flag bits in the parsers flag word. PS_GetFlags( ) returns the whole flags word. These flags may be used by resolver 400s and plug-ins to maintain state information.

PS_GetIntegerStackValue( ), PS_GetRealStackValue( ). These functions obtain an integer or real value from the parse evaluation stack 215.

PS_Sprintf( ). This function implements a standard C library sprintf( ) capability within a parser 205 for use by embedded languages where the arguments to PS_Sprintf( ) are obtained from the parser evaluation stack 215. This function is simply provided as a convenience for implementing this common feature.

PS_Parse( ). This function parses an input string according to the grammar provided, as set forth above. Sample code illustrating one embodiment of this function is also provided in Appendix A.

The foregoing description of the preferred embodiments of the invention has been presented for the purposes of illustration and description. For example, the term "parser" throughout this description is addressed as it is currently used in the computer arts related to compiling. This term should not be narrowly construed to only apply to compilers or related technology, however, as the method and system could be used to enhance any sort of data management system. The descriptions of the header structures should also not be limited to the embodiments described. While the sample code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix A provides code for a sample Application Programming Interface (API) for the parser of the present invention.

The invention claimed is:

1. A system for parsing complex language input comprising:
   a processor;
   logically connected to said processor, a table-driven predictive parser;
   logically connected to said predictive parser, an application programming interface which permits registration and use of one or more plug-ins and one or more resolvers;
   a means for choosing and specifying a source grammar to be parsed by said predictive parser, converting said source grammar to an equivalent one or more parsing tables, and logically connecting said one or more parsing tables to said predictive parser for parsing the complex language input;
   a means for invoking by said predictive parser said one or more resolvers such that the complex language input is passed by said predictive parser through said one or more resolvers for tokenization into a token stream; and
   a means for invoking by said predictive parser said one or more plug-ins, which are logically connected to said one or more resolvers, wherein said one or more plug-ins interpret any reverse-polish operators embedded in said specified source grammar when exposed on a parser stack by said predictive parser.

2. The system of claim 1, wherein operation of said predictive parser is specified via a modified form of a Backus-Naur Form.

3. The system of claim 2, wherein said predictive parser includes support for a one or more meta-symbols that allow explicit control over parser backup and re-try within a Backus-Naur Form syntax.

4. The system of claim 2, wherein said predictive parser makes calls to explicit reverse-polish operators embedded within said Backus-Naur Form.

5. The system of claim 4, wherein said predictive parser passes arbitrary 'hint' text embedded in said Backus-Naur Form to said one or more resolvers as a parameter.

6. The system of claim 5, wherein said predictive parser supports specifying an occurrence of one or more terminal symbols in a grammar within said Backus-Naur Form as numbered token values.

7. The system of claim 5, wherein said predictive parser supports specifying an occurrence of one or more terminal symbols in a grammar within said Backus-Naur Form in native form.

8. The system of claim 2, wherein said predictive parser supports a one or more meta-symbols within said Backus-Naur Form wherein said one or more meta-symbols permits said one or more plug-ins to determine a number of operands passed to said one or more plug-ins.

9. The system of claim 2, wherein said predictive parser supports an end-of-line meta-symbol within said Backus-Naur Form to allow explicit control of use of end-of-line for certain text based languages.

10. The system of claim 2, wherein said predictive parser supports use of a meta-symbol in said Backus-Naur Form that permits explicit control of parser backup from within said grammar of said Backus-Naur Form by said one or more plug-ins and said one or more resolvers.

11. The system of claim 2, wherein said predictive parser supports use of an explicit ambiguity, wherein said explicit ambiguity is a multiply defined FIRST sets.

12. The system of claim 1, wherein said one or more resolvers are dynamically registered with said predictive parser such that additional parsers can be rapidly created and customized in real time.

13. The system of claim 1, wherein said one or more plug-ins are dynamically registered with said predictive parser such that additional parsers can be rapidly created and customized in real time.

14. The system of claim 1, wherein said application programming interface provides said one or more resolvers and said one or more plug-ins with full control over said parser stack.

15. The system of claim 1, wherein said application programming interface provides said one or more resolvers and said one or more plug-ins with full control over an evaluation stack.

16. The system of claim 1, wherein said application programming interface provides said one or more resolvers and said one or more plug-ins with full control over any tokens in said token stream being processed by said predictive parser.

17. The system of claim 1, wherein said predictive parser includes a pre-defined plug-in wherein said pre-defined plug-in provides inherent support for all unary, binary, and ternary operators found in a C programming language.

18. The system of claim 17, wherein said pre-defined plug-in is a plug-in zero.

19. The system of claim 1, wherein lexical analysis is provided by a lexical analyzer, wherein said lexical analyzer has a first table describing single transitions, and a second table describing range transitions, and a first phase of analysis that utilizes said first table, and a second phase of analysis that utilizes said second table.

20. A method for parsing data with a table-driven predictive parser running in a processor, the method comprising the steps of:
  specifying a specific source language syntax to be parsed to the predictive parser at run-time via a parser specification using a specification language describing not only parser productions in response to input tokens and syntax, but also one or more registered plug-in operators to be called at specified points in the parsing process determined by when said one or more registered plug-in operators are popped off a parser stack associated with the predictive parser;
  converting said parser specification into one or more parser tables to drive operation of the predictive parser that is otherwise unmodified and source language independent;
  calling the predictive parser a registered resolver in order to obtain a series of tokens from an input token stream, passing a 'no action' mode parameter to indicate an input token request wherein said registered resolver may at any time it is called (regardless of said mode parameter), choose to alter either a subsequent token stream returned, a state of said parser stack, or a state of an evaluation stack associated with the predictive parser; and
  when a one of said series of tokens has a value within a first defined range, pushing by the predictive parser said one of said series of tokens onto said evaluation stack as an un-resolved symbol referencing a text string of said one of said series of tokens.

21. The method according to claim 20, further comprising the steps of:
  when said one or more registered plug-in operators attempt to assign a value to said evaluation stack, calling said registered resolver; and
  passing an 'assign' mode parameter to perform any semantic action necessary upon said passing said 'assign' mode parameter.

22. The method according to claim 20, wherein said calling said registered resolver step further comprises permitting said registered resolver to interface with an external storage during the parsing.

23. The method according to claim 20, further comprising the step of:
  converting by said registered resolver said un-resolved symbol in said evaluation stack to an actual value for use by said one or more registered plug-in operators by passing said registered resolver an 'evaluate' mode parameter whenever said one or more registered plug-in operators attempt to access a value on said evaluation stack for a read.

24. The method according to claim 20, wherein said calling said registered resolver step further comprises permitting said registered resolver to obtain a value from said evaluation stack.

25. The method according to claim 20, wherein said calling said registered resolver step further comprises permitting said registered resolver to obtain a value from an external storage or a contextual source.

* * * * *

UNITED STATES PATENT AND TRADEMARK OFFICE
CERTIFICATE OF CORRECTION

PATENT NO. : 7,210,130 B2
APPLICATION NO. : 10/357324
DATED : April 24, 2007
INVENTOR(S) : John Fairweather It is certified that error appears in the above-identified patent and that said Letters Patent is hereby corrected as shown below:

Column 16,
line 62, Delete the number "2" and replace with the number -- 1 --.

Signed and Sealed this

Seventeenth Day of July, 2007

JON W. DUDAS
*Director of the United States Patent and Trademark Office*